(12) United States Patent
Chiang et al.

(10) Patent No.: US 11,386,714 B1
(45) Date of Patent: Jul. 12, 2022

(54) MOTION RECOGNITION APPARATUS AND METHOD

(71) Applicant: Institute For Information Industry, Taipei (TW)

(72) Inventors: Chen-Kuo Chiang, Taipei (TW); Yung-Pin Liu, Taipei (TW); Chih-Cheng Lin, Taipei (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 1 day.

(21) Appl. No.: 17/155,353

(22) Filed: Jan. 22, 2021

(30) Foreign Application Priority Data

Jan. 8, 2021 (TW) ................................. 110100748

(51) Int. Cl.
*G06V 40/20* (2022.01)
*G06K 9/62* (2022.01)
(Continued)

(52) U.S. Cl.
CPC ............. *G06V 40/20* (2022.01); *G06F 3/01* (2013.01); *G06K 9/6223* (2013.01); *G06K 9/6234* (2013.01); *G06K 9/6256* (2013.01); *G06K 9/6272* (2013.01); *G06N 3/0445* (2013.01); *G06N 3/0454* (2013.01); *G06N 3/08* (2013.01); *G06V 10/758* (2022.01)

(58) Field of Classification Search
CPC ........ G06V 40/20; G06V 10/758; G06F 3/01; G06K 9/6223; G06K 9/6234; G06K 9/6256; G06K 9/6272; G06N 3/0445; G06N 3/0454; G06N 3/08
See application file for complete search history.

(56) References Cited

U.S. PATENT DOCUMENTS 10,161,954 B2 * 12/2018 Wang ................. G06K 9/00496
10,769,442 B1 * 9/2020 Ding ...................... G06V 40/20
(Continued)

FOREIGN PATENT DOCUMENTS

| TW | 200910221 A | 3/2009 |
|---|---|---|
| TW | 201727236 A | 8/2017 |

OTHER PUBLICATIONS

The office action of the corresponding Taiwanese application No. TW110100748 dated Oct. 5, 2021.

*Primary Examiner* — Grant Sitta
(74) *Attorney, Agent, or Firm* — CKC & Partners Co., LLC (57) ABSTRACT

A motion recognition apparatus extracts a plurality of first motion feature vectors within a period of time, and extracts a plurality of second motion feature vectors within another period of time closely next to the period of time. The apparatus calculates and sequences the distances between each of the plurality of first motion feature vectors and the plurality of cluster centroids to generate a corresponding first cluster centroid sequence respectively, and calculates and sequences the distances between each of the plurality of second motion feature vectors and the plurality of cluster centroids to generate a corresponding second cluster centroid sequence respectively. The apparatus recognizes a first segment motion, a second segment motion, and a whole motion based on the number of appearances of the cluster centroid in the first cluster centroid sequences, the second cluster centroid sequences and both of them respectively.

16 Claims, 4 Drawing Sheets

(51) Int. Cl.
*G06N 3/08* (2006.01)
*G06F 3/01* (2006.01)
*G06N 3/04* (2006.01)
*G06V 10/75* (2022.01)

(56) References Cited

U.S. PATENT DOCUMENTS

| | | | |
|---|---|---|---|
| 11,200,429 B1 * | 12/2021 | Evans | G06V 10/255 |
| 2018/0225820 A1 * | 8/2018 | Liang | G16H 50/20 |
| 2021/0012100 A1 * | 1/2021 | Hoffmann | G06F 3/017 |
| 2021/0407107 A1 * | 12/2021 | Lee | G06V 10/74 |

\* cited by examiner

MOTION RECOGNITION APPARATUS AND METHOD

PRIORITY

This application claims priority to Taiwan Patent Application No. 110100748 filed on Jan. 8, 2021, which is hereby incorporated by reference in its entirety.

FIELD

The present invention relates to a motion recognition apparatus and a motion recognition method for the motion recognition apparatus. Specifically, the present invention relates to a motion recognition apparatus and a motion recognition method for the motion recognition apparatus that can recognize a segment motion and a continuous motion simultaneously.

BACKGROUND

Some motion recognition models based on "machine learning" have been proposed. Nevertheless, these motion recognition models cannot accurately recognize both of a segment motion and a whole motion from a continuous motion simultaneously. The lengths of time of the segment motion and the whole motion are different, whereas the current motion recognition models can only be produced for a motion training and a motion recognition within a fixed-length of time. In other words, a traditional motion recognition model can only accurately recognize a segment motion (a short-time motion) in a continuous motion if the model is produced by machine training for short-time motions. On the contrary, a traditional motion recognition model can only accurately recognize a whole motion (long-time motion) in the continuous motion if the model is produced by machine training for long-time motions. Therefore, a combination of a short-time motion recognition model and a long-time motion recognition model is necessary, if it is desired to accurately recognize a segment motion and a whole motion in a continuous motion simultaneously. However, the combination will significantly increase a variety of costs (e.g., modeling, training, testing, etc.), and there is a technical barrier that must be overcome regarding the combination.

Accordingly, how to provide a motion recognition technology that can accurately recognize a segment motion and a whole motion in the continuous motion simultaneously will be an urgent problem in the art.

SUMMARY

To solve at least the aforesaid problems, provided is a motion recognition apparatus. The motion recognition apparatus may comprise a storage and a processor which is electrically connected to the storage. The storage is configured to store a feature extractor, a clusterer, a classifier, and data to be recognized. The processor is configured to extract, through the feature extractor, a plurality of first motion feature vectors within a first period of time and a plurality of second motion feature vectors within a second period of time from the data to be recognized, wherein the first period of time is followed by the second period of time. The processor is also configured to calculate and sequence the distances between each of the first motion feature vectors and a plurality of cluster centroids through the clusterer to generate a first cluster centroid sequence for each of the first motion feature vectors, and calculate and sequence the distances between each of the second motion feature vectors and the plurality of cluster centroids through the clusterer to generate a second cluster centroid sequence for each of the second motion feature vectors. The processor is further configured to obtain a first histogram based on the number of appearances of the cluster centroids in the plurality of first cluster centroid sequences, obtain a second histogram based on the number of appearances of the cluster centroids in the plurality of second cluster centroid sequences, and obtain a third histogram based on the number of appearances of the cluster centroids in the plurality of first and second cluster centroid sequences. Then, the processor is configured to recognize, through the classifier, a first segment motion corresponding to the first histogram, a second segment motion corresponding to the second histogram, and a whole motion corresponding to the third histogram.

To solve at least the aforesaid problems, also provided is a motion recognition method for the motion recognition apparatus. The method may comprise the following steps: extracting, by a feature extractor, a plurality of first motion feature vectors within a first period of time and a plurality of second motion feature vectors within a second period of time from data to be recognized, wherein the first period of time is followed by the second period of time; calculating and sequencing, by a clusterer, the distances between each of the first motion feature vectors and a plurality of cluster centroids to generate a first cluster centroid sequence for each of the first motion feature vectors, and the distances between each of the second motion feature vectors and the plurality of cluster centroids to generate a second cluster centroid sequence for each of the second motion feature vectors; obtaining a first histogram based on the number of appearances of the cluster centroids in the plurality of first cluster centroid sequences, obtaining a second histogram based on the number of appearances of the cluster centroids in the plurality of second cluster centroid sequences, and obtaining a third histogram based on the number of appearances of the cluster centroids in the plurality of first and second cluster centroid sequences; and recognizing, by a classifier, a first segment motion corresponding to the first histogram, a second segment motion corresponding to the second histogram, and a whole motion corresponding to the third histogram.

As described above, the plurality of cluster centroids may be represented as the "motion basis" of the data to be recognized, and each of the first cluster centroid sequences and each of the second cluster centroid sequences is calculated based on the same "motion basis". In addition, the first histogram obtained based on calculating the number of appearances of the cluster centroids in the plurality of first cluster centroid sequences is used to recognize the segment motion ("short-time motion") within a first period of time in the continuous motion, the second histogram obtained based on calculating the number of appearances of the cluster centroids in the plurality of second cluster centroid sequences is used to recognize the segment motion ("short-time motion") within a second period of time in the continuous motion, and the third histogram obtained based on calculating the number of appearances of the cluster centroids in the plurality of first and second cluster centroid sequences is used to recognize the whole motion ("long-time motion") that across the first period of time and the second period of time in the continuous motion. The first cluster centroid sequences and the second cluster centroid sequences correspond to the same set of cluster centroids, which means that the first histogram, second histogram, and third histogram are represented by the same "motion basis". Accordingly, in this disclosure, only one motion recognition model needs to be established so as to accurately recognize each segment motion ("short-time motion") in a continuous motion and one or more whole motions ("long-time motion") composed of several different segment motion in the continuous motion simultaneously. Thereby, a variety of costs (e.g., modeling, training, testing, etc.) caused by combining a short-time motion recognition model and a long-time motion recognition model and the technical barrier to the combination can be avoided. Hence, as disclosed the above-mentioned problems faced by traditional motion recognition can be solved effectively.

What has described above is not intended to limit the present invention, but merely outlines the solvable technical problems, the usable technical means, and the achievable technical effects for a person having ordinary skill in the art to preliminarily understand the present invention. According to the attached drawings and the following detailed description, a person having ordinary skill in the art can further understand the details of a variety of embodiments of the present invention.

DETAILED DESCRIPTION

In the following description, the present invention will be described with reference to certain example embodiments thereof. However, these example embodiments are not intended to limit the present invention to any operations, environment, applications, structures, processes, or steps described in these example embodiments. For ease of description, contents unrelated to the embodiments of the present invention or contents that shall be appreciated without particular description are omitted from depiction; and dimensions of elements and proportional relationships among individual elements in the attached drawings are only exemplary examples but not intended to limit the scope of the claimed invention. Unless stated particularly, same (or similar) reference numerals may correspond to same (or similar) elements in the following description. Unless otherwise specified, the number of each element described below may be one or more while it is implementable.

Terms used in this disclosure are only used to describe the embodiments, and are not intended to limit the scope of the present invention. Unless the context clearly indicates otherwise, singular forms "a" and "an" are intended to comprise the plural forms as well. Terms such as "comprising" and "including" indicate the presence of stated features, integers, steps, operations, elements, and/or components, but do not exclude the presence of one or more other features, integers, steps, operations, elements, components, and/or combinations thereof. The term "and/or" comprises any and all combinations of one or more associated listed items.

Unless the context clearly indicates otherwise, terms such as "period of time," "motion feature vectors," "cluster centroid sequences," "histogram," and "motion" are preceded by ordinal numerals "first," "second," and "third" are only used to distinguish that these terms refer to different items, and should not be understood as sequential.

Figure 1A:
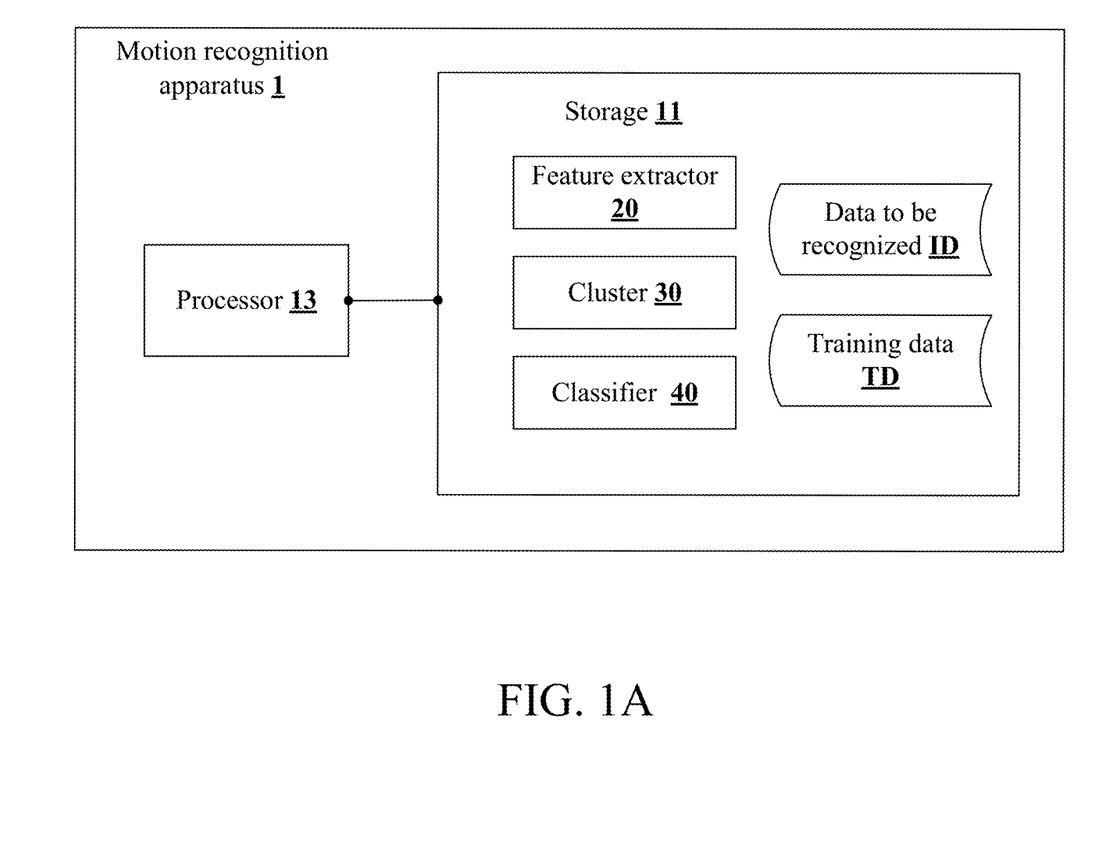
FIG. 1A illustrates a schematic view of a structure of a motion recognition apparatus according to some embodiments of the present invention.

FIG. 1A illustrates a schematic view of a structure of a motion recognition apparatus according to some embodiments of the present invention. However, the contents shown in FIG. 1A are only for illustrating embodiments of the present invention, and not for limiting the scope of the claimed invention.

As shown in FIG. 1A, a motion recognition apparatus 1 may comprise a storage 11 and a processor 13, which both are electrically connected to each other (directly or indirectly). The processor 13 may be a programmable special integrated circuit, which has the functions of calculation, storage, output/input, etc., and can receive and process various coded instructions, thereby performing various logical calculations and mathematical operations, and outputting the corresponding calculated result. The processor 13 may be programmed to interpret various instructions and perform various tasks or programs to complete a variety of actions described in this disclosure. For example, the processor 13 may comprise a central processing unit (CPU), a digital signal processor (DSP), a microprocessor unit (MPU), and/or a microcontroller, etc.

The storage 11 may comprise a primary storage device (e.g., a memory), which is directly or indirectly connected to the processor 13 and stores instruction sets readable by the processor 13. In some embodiments, in addition to the primary storage device, the storage 11 may also comprise a secondary storage device (e.g., various types of hard disks or optical disks), which is connected to the processor 13 through I/O channels of a memory, and uses a data buffer to transfer data to the primary storage device. In some embodiments, in addition to the primary storage device and secondary storage device, the storage 11 may also comprise a tertiary storage device (e.g., a flash drive or cloud drive) that can also transfer data with the secondary storage device.

The storage 11 may be configured to store a feature extractor 20, a clusterer 30, a classifier 40, and one or more data to be recognized ID. Each data to be recognized ID may comprise a continuous motion data. For example, the continuous motion data may correspond to a continuous motion (e.g., reach out and shake hands, or squat down and jump, etc.) generated within a period of long-time (e.g., 2 seconds), and the continuous motion may comprise a plurality of segment motions (e.g., reaching out within the first 1 second and shaking hands within the next 1 second, or squatting down within the first 1 second and jumping within the next 1 second, etc.) generated within a plurality of period of short-time (e.g., one second) respectively.

The feature extractor 20, the clusterer 30, and the classifier 40 stored in the storage 11 may be established by the motion recognition apparatus 1 or may be pre-established by an external device. The storage 11 can additionally store a plurality of training data TD, if the feature extractor 20, the clusterer 30, and the classifier 40 are built by the motion recognition apparatus 1. The processor 13 uses the training data TD to train a feature Extraction model, a cluster model, and a classification model to build the feature extractor 20, the clusterer 30, and the classifier 40 respectively. Same as the data to be recognized ID, each training data TD may also comprise a continuous motion data corresponding to a continuous motion generated within a period of long-time, and the continuous motion may comprise a plurality of segment motions generated within a plurality of period of short-time respectively.

The feature extractor 20 may be various known feature extractors. For example, in some embodiments, the feature extractor 20 may be a Convolution Auto-Encoder (CAE), and the processor 13 can use the training data TD to train a CAE model to generate the feature extractor 20. Each continuous motion data included in the training data TD may comprise a plurality of motion data across multiple time points, and each motion data can be used as an input of the CAE model. The CAE model may comprise an encoder and a decoder. The encoder can encode and convert the input to generate a Latent-Space Representation, and the decoder can decode the Latent-Space Representation to generate an output of the CAE model. Next, the processor 13 repeatedly adjusts the parameters of the CAE model until the output of the CAE model approaches the input of the CAE model, so as to train the encoder into the feature extractor 20. The processor 13 can extract, through the feature extractor 20, a set of motion features (i.e., a Latent-Space Representation) from each motion data included in each continuous motion data included in the training data TD, and the set of motion features is represented as a motion feature vector (e.g., 128-dimensional vector after dimensionality reduction).

The clusterer 30 may be various known clusterers. For example, in some embodiments, the clusterer 30 may be a k-means clusterer, and the processor 13 can train a k-means cluster model using the motion feature vectors from the training data TD to generate the clusterer 30. The k-means cluster model may group the motion feature vectors generated by the feature extractor 20 based on the total number of clusters and the positions of the initial cluster centroids, and adjust the cluster centroids based on the result. The above steps are repeated until the positions of the cluster centroids does not approximately change, so as to train the k-means cluster model into a clusterer 30. The clusterer 30 may comprise a plurality of clusters, and each of the clusters has a cluster centroid. The processor 13 can calculate, through the clusterer 30, the distances between each of motion feature vectors generated by the extractor 20 and the positions of the plurality of cluster centroids, and generates a cluster centroid sequence for each of the motion feature vectors according to the lengths of the calculated distances from near to far. The number of elements in each cluster centroid sequence is less than the number of cluster centroid of the clusterer 30. For example, the number of elements in each cluster centroid sequence may be first twenty (20) or the first thirty (30), as the number of cluster centroids of the clusterer 30 is fifty (50) (i.e., only maintaining the first twenty (20) or the first thirty (30) cluster centroids that close to the motion feature vectors).

Figure 1B:
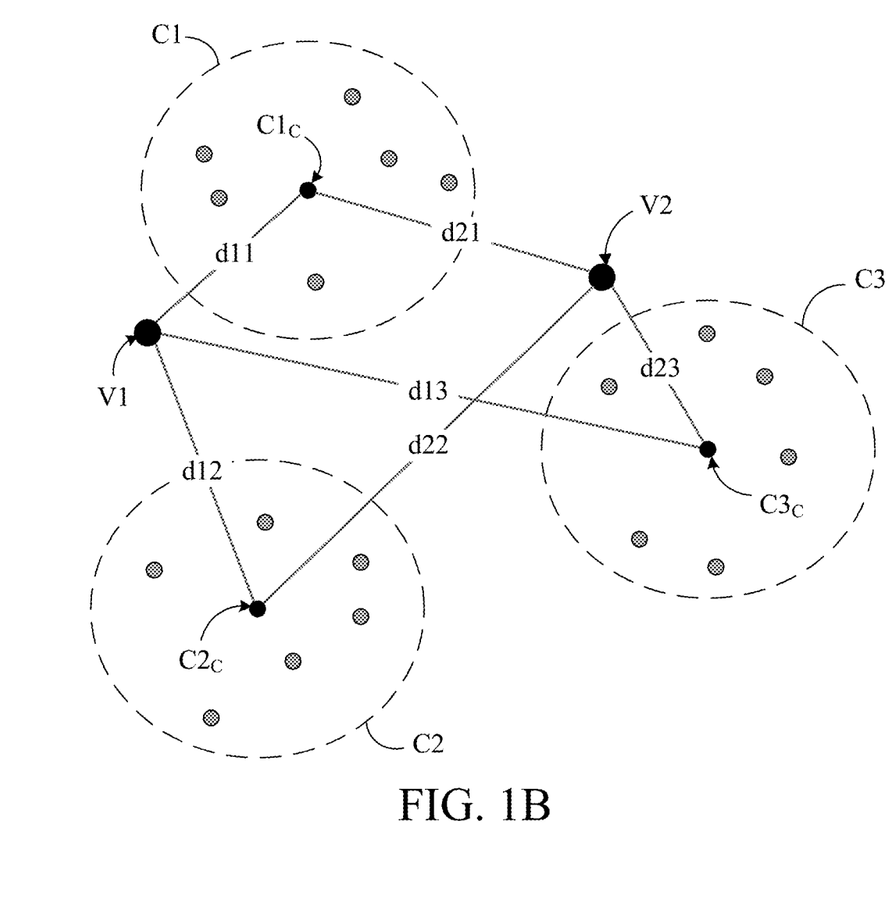
FIG. 1B is a schematic view illustrating how to generate a cluster centroid sequence by a motion recognition apparatus according to some embodiments of the present invention.

How to generate the above cluster centroid sequence is further described with FIG. 1B. FIG. 1B is a schematic view illustrating how to generate a cluster centroid sequence by the motion recognition apparatus 1 according to some embodiments of the present invention. The contents shown in FIG. 1B are shown only for the purpose of illustrating embodiments of the present invention and are not intended to limit the scope of the claimed invention.

As shown in FIG. 1B, the clusterer 30 comprises the clusters C1, C2, and C3, the clusters C1, C2, and C3 have cluster centroids C1c, C2c, and C3c respectively. The processor 13 can calculate, through the clusterer 30, the distances d11, d12, and d13 between the motion feature vector V1 and the positions of the cluster centroids C1c, C2c, and C3c respectively, and generates a cluster centroid sequence S1 based on the lengths of the distances d11, d12, and d13 from near to far. In addition, the processor 13 can calculate, through the clusterer 30, the distances d21, d22, and d23 between the motion feature vector V2 and the cluster centroids C1c, C2c, and C3c respectively, and generates a cluster centroid sequence S2 based on the lengths of the distances d21, d22, and d23 from near to far. Since the distance d11 is smaller than the distance d12 which is smaller than the distance d13, the cluster centroid sequence S1 can be expressed as [1, 2, 3]. Likewise, since the distance d23 is smaller than the distance d21 which is smaller than the distance d22, the cluster centroid sequence S2 can be expressed as [3, 1, 2].

The processor 13 can calculate the number of the motion feature vectors within a period of time (e.g., a period of long-time or a period of short-time) from the training data TD and decide the number of cluster centroid sequences within the period of time via a sliding window. The sliding window is a window that overlaps with its previous or next window. For example, the processor 13 can calculate the number of short-time motion feature vectors within a period of short-time according to the following equation (1), and calculate the number of cluster centroid sequences within the period of short-time according to the parameters of the equation (1):

$$T = k + w*n \qquad (1)$$

where, the parameter T represents the number of short-time motion feature vectors within a period of short-time, the parameter k represents the size of the sliding window, the parameter w represents the sliding step of the sliding window, and the parameter n represents the number of sliding. In a case where k=10, w=1, and n=20, the number of short-time motion feature vectors within the period of short-time is 30 (i.e., "T") and the number of cluster centroid sequences within the period of short-time is 21 (i.e., "n+1").

The processor 13 may generate a plurality of cluster centroid sequences corresponding to each period of short-time through the above operations of the feature extractor 20 and the clusterer 30 according to the above equation (1), and the processor 13 may generate a short-time histogram for each period of short-time by counting the number of appearances of the cluster centroids in the plurality of cluster centroid sequences generated within each period of short-time. In addition, the processor 13 may generate a plurality of cluster centroid sequences corresponding to each period of long-time through the above operations of the feature extractor 20 and the clusterer 30, and the processor 13 may generate a long-time histogram for each period of long-time by counting the number of appearances of the cluster centroids in the plurality of cluster centroid sequences generated within each period of long-time. The short-time histogram and the long-time histogram are represented by the same "motion basis".

Figure 1C:
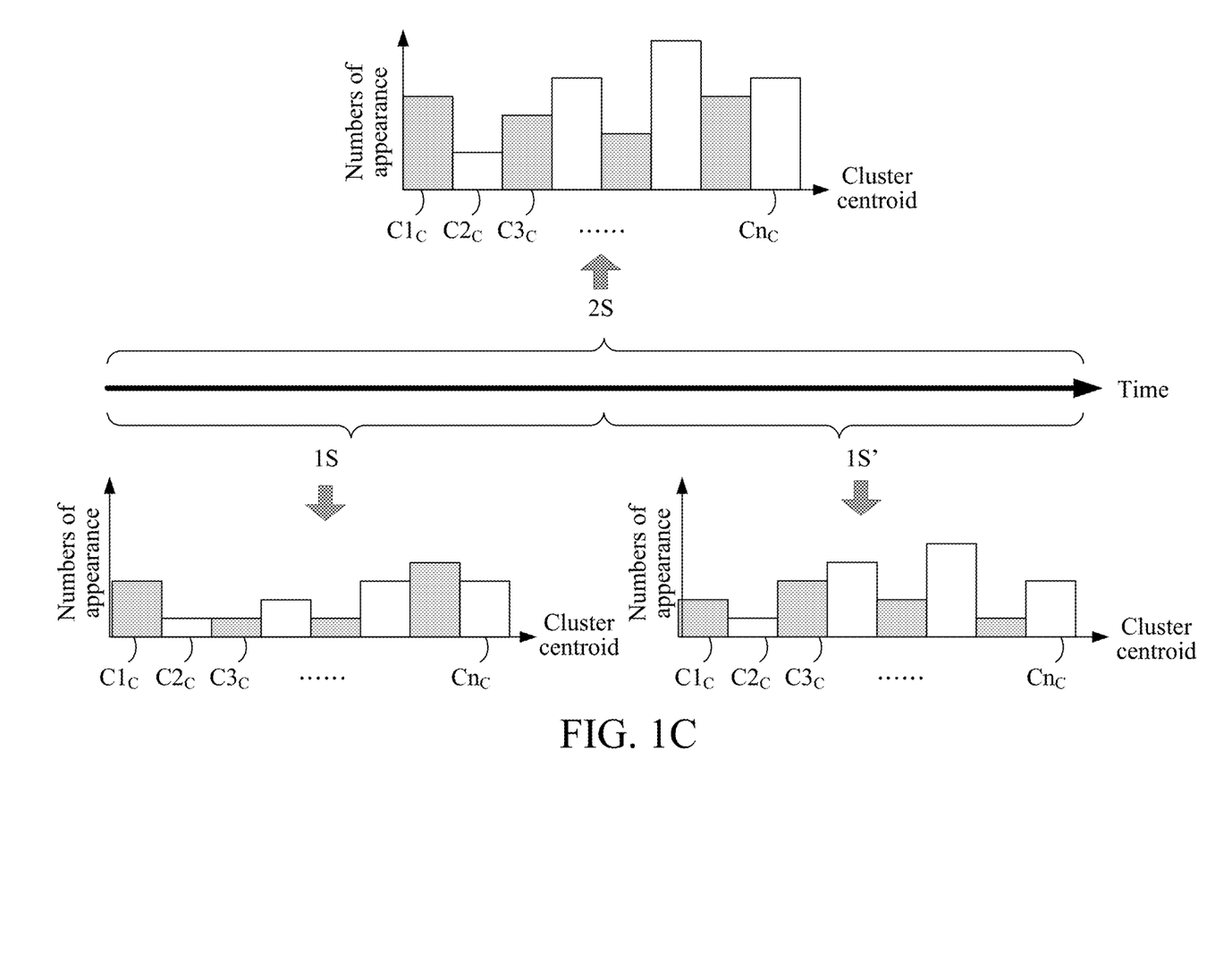
FIG. 1C is a schematic view illustrating how to calculate to obtain a histogram by a motion recognition apparatus according to some embodiments of the present invention.

How to generate the above histogram will be described with FIG. 1C. FIG. 1C is a schematic view illustrating how to calculate so as to obtain a histogram by a motion recognition apparatus 1 according to some embodiments of the present invention. The contents shown in FIG. 1C are shown only for the purpose of illustrating embodiments of the present invention and are not intended to limit the scope of the claimed invention.

As shown in FIG. 1C, the processor 13 can extract, through the feature extractor 20, a plurality of first motion feature vectors corresponding to a plurality of motion data within the first period of time 1S (e.g., from 0 second to 1 second) from the training data TD. The "first" motion feature vectors are defined based on the "first" period of time 1S. In addition, the first motion feature vectors are sequenced according to the sliding window, so the first motion feature vectors may be identical or different). The processor 13 can also extract, through the feature extractor 20, a plurality of second motion feature vectors corresponding to a plurality of motion data within the second period of time 1S' closely next to the first period of time 1S (e.g., from 1 second to 2 second) from the training data TD. The "second" motion feature vectors are defined based on the "second" period of time 1S'. In addition, the second motion feature vectors are sequenced according to the sliding window, so the second motion feature vectors may be identical or different). The processor 13 can calculate and sequence the distances between the plurality of first motion feature vectors and the plurality of cluster centroids through the clusterer 30 to generate a first cluster centroid sequence for each of the first motion feature vectors. Likewise, the processor 13 can calculate and sequence the distances between the plurality of second motion feature vectors and the plurality of cluster centroids through the clusterer 30 to generate a second cluster centroid sequence for each of the second motion feature vectors. Here, the plurality of cluster centroids may be represented as "motion basis" of the training data TD, and thus each of the first cluster centroid sequences and second cluster centroid sequences is calculated based on the same "motion basis".

The processor 13 may further obtain a first histogram corresponding to the first period of time 1S (short-time) based on calculating the number of appearances of the cluster centroids in the plurality of first cluster centroid sequences, and obtain a second histogram corresponding to the second period of time 1S' (short-time) based on calculating the number of appearances of the cluster centroids in the plurality of second cluster centroid sequences. Besides, the processor 13 may obtain a third histogram corresponding to the period of time 2S (long-time) based on calculating the number of appearances of the cluster centroids in the plurality of first and second cluster centroid sequences. The third histogram is equivalent to the result of adding the value of the first histogram and the second histogram, and the first cluster centroid sequences and the second cluster centroid sequences all correspond to the same cluster centroids. In other words, the first histogram, the second histogram, and the third histogram are all represented by the same "motion basis".

The processor 13 may extract the plurality of first motion feature vectors within the first period of time 1S, and then extract the plurality of second motion feature vectors within the second period of time 1S', but the reverse is also feasible. After the plurality of first motion feature vectors are calculated, the processor 13 may calculate the distances between each of the first motion feature vectors and the plurality of cluster centroids, and then extract the plurality of second motion feature vectors within the second period of time 1S'. Alternatively, after the plurality of first motion feature vectors are calculated, the processor 13 may extract the plurality of second motion feature vectors within the second period of time 1S', and then calculate the distances between each of the first motion feature vectors and the plurality of cluster centroids.

The classifier 40 may be various known classifiers. For example, in some embodiments, the classifier 40 may be a Long Short Term Memory (LSTM) classifier, and the processor 13 can use the short-time histogram and the long-term histogram from the training data TD to train an LSTM model to generate a classifier 40. In detail, the processor 13 may input a short-time histogram and a long-time histogram represented by the same "motion basis" into the LSTM classification model respectively, and the LSTM classification model will classify the short-time histogram and the long-time histogram into the corresponding motions respectively. The processor 13 may compare the motions of the short-time histogram and the long-time histogram with the Ground Truth to calculate their similarity degrees respectively, and determine the motions as the answers if the calculated similarity degrees are high enough. The above steps will be repeated until a preset loss function is satisfied to train the LSTM classification model as the classifier 40.

In some embodiments, the preset loss function may be represented by a classification loss. For example, the preset loss function may be represented as follows:

$$\mathcal{L}_c^t = -\log p_t^{y_t} \quad (2)$$

where, the parameter t represents a time point, the parameter $y_t$ represents a motion at the time point, and the parameter $p_t$ represents a detection score (i.e., probability) of the motion.

In some embodiments, the preset loss function may be represented by a classification loss and a ranking loss. For example, the preset loss function may be represented as follows:

$$\mathcal{L}^t = \mathcal{L}_c^t + \lambda_r \mathcal{L}_r^t \quad (3)$$

where, the parameter $\mathcal{L}_c^t$ represents the classification loss, the parameter $\lambda_r$ represents a control constant, and $\mathcal{L}_r^t$ represents the ranking loss.

In some embodiments, the ranking loss may be defined as a ranking ross $\mathcal{L}_s^t$ based on a detection score. The ranking loss $\mathcal{L}_s^t$ can be used to increase the score of the motion itself. For example, the ranking loss $\mathcal{L}_s^t$ may be represented as follows:

$$\mathcal{L}_s^t = \max(0, -\alpha_t(p_t^{y_{t-1}} - p_t^*)) \quad (4)$$

where, the parameter $p_t^{y_{t-1}}$ represents a detection score of a motion y at a time point t−1; when the motion y at the time point t is the same as a motion $y_{t-1}$ at the time point t−1, $\delta_t=1$ and $p_t^*$ is the maximum detection score between the initial time point $t_s$ and the time point t−1; and when the motion y at a time point t is different from the motion $y_{t-1}$ at the time point t−1, $\delta_t=-1$ and $p_t^*=0$.

In some embodiments, the ranking loss $\mathcal{L}_r^t$ may also be defined as a ranking loss $\mathcal{L}_m^t$ based on a discriminative margin. The ranking loss $\mathcal{L}_m^t$ can be used to increase the score of a motion and restrain the most similar but wrong motion. In some embodiments, it can be considered whether the discriminative margin meets a threshold. If the threshold is met, the concerned motion is selected; however, if the threshold is not met, another motion at another time point will be added for further determination. In summary, the discriminative margin is the difference between a detection score of a motion and the maximum detection score of another motion, which may be represented as follows:

$$m_t^{y_t} = p^{y_t} - \max_{y' \neq y_t} p^{y_t} \quad (5)$$

where, the motion $y_t$ is different from the motion y', the parameter $p^{y_t}$ represents a detection score of the motion $y_t$, and the term $$\max_{y' \neq y_t} p^{y_t}$$

represents the maximum detection score of the motion y'. Here, for example, the ranking loss $\mathcal{L}_m^t$ may be represented as follows:

$$\mathcal{L}_m^t = \max(0, -\delta_t(m_t^{y_{t-1}} - m_t^*)) \quad (6)$$

where, the parameter $m_t^{y_{t-1}}$ represents a discriminative margin of a motion y at a time point t−1; when the motion y at the time point t is the same as a motion $y_{t-1}$ at a time point t−1, $\delta_t=1$ and $m_t^*$ is the maximum Discriminative Margin from the initial time point $t_s$ to the time point t−1; and when the motion y at time point t is different from the motion $y_{t-1}$ at time point t−1, $\delta_t=-1$ and $m_t^*=0$.

In the recognition stage, the processor 13 may extract, through the feature extractor 20, a plurality of short-time motion feature vectors within each period of short-time and a plurality of long-time motion feature vectors within each period of long-time. After that, the processor 13 may calculate and sequence, through the clusterer 30, the distances between each of the short-time motion feature vectors and the plurality of cluster centroids to generate a short-time cluster centroid sequence for each of the short-time motion feature vectors, and the distances between each of the long-time motion feature vectors and the plurality of cluster centroids to generate a long-time cluster centroid sequence for each of the long-time motion feature vectors. Here, the plurality of cluster centroids may be represented as the "motion basis" of the data to be recognized ID, and thus the short-time cluster centroid sequences and the long-time cluster centroid sequences all are calculated based on the same "motion basis".

Next, the processor 13 may obtain a short-time histogram for each period of short-time by counting the number of appearances of the cluster centroids in the plurality of short-time cluster centroid sequences, and obtain a long-time histogram for each period of long-time by counting the number of appearances of the cluster centroids in the plurality of long-time cluster centroid sequences. The short-time cluster centroid sequences and the long-time cluster centroid sequences all correspond to the same cluster centroids, which means that the short-time histograms and long-time histograms all are represented by the same "motion basis". Finally, through the classifier 40, the processor 13 may classify each obtained short-time histogram to recognize a short-time motion (segment motion), and classify each obtained long-time histogram to recognize a long-time motion (whole motion).

Take continuous motion data only comprising first motion data within the first period of time and second motion data within the second period of time closely next to the first period of time for example. The processor 13 may extract, through the feature extractor 20, the plurality of first motion feature vectors of the first motion data within the first period of time and the plurality of second motion feature vectors of the second motion data within the second period of time, wherein the first period of time is followed by the second period of time. Then, the processor 13 may calculate and sequence, through the clusterer 30, the distances between each of the first motion feature vectors and a plurality of cluster centroids to generate a first cluster centroid sequence for each of the first motion feature vectors, and the distances between each of the second motion feature vectors and the plurality of cluster centroids to generate a second cluster centroid sequence for each of the second motion feature vectors. Here, the plurality of cluster centroids may be represented as the "motion basis" of the data to be recognized ID, and thus the first cluster centroid sequences and the second cluster centroid sequences all are calculated based on the same "motion basis".

The processor 13 may obtain a first histogram based on calculating the number of appearances of the cluster centroids in the plurality of first cluster centroid sequences, obtain a second histogram based on calculating the number of appearances of the cluster centroids in the plurality of second cluster centroid sequences, and obtain a third histogram based on calculating the number of appearances of the cluster centroids in the plurality of first and second cluster centroid sequences. The first cluster centroid sequences and the second cluster centroid sequences all correspond to the same cluster centroids. In other words, the first histogram, the second histogram, and the third histogram are all represented by the same "motion basis". Finally, through the classifier 40, the processor 13 may classify each obtained the first histogram, the second histogram, and the third histogram to recognize a first segment motion (segment motion within the first period of time) corresponding to the first histogram, a second segment motion (segment motion within the second period of time) corresponding to the second histogram, and a whole motion (whole motion within the first and second period of time) corresponding to the third histogram.

In some embodiments, the motion recognition apparatus 1 may additionally comprise an input interface, wherein the input interface is configured to receive the data to be recognized ID from a sensor. For example, the sensor may comprise an Inertial Measurement Unit (IMU) for generating the data to be recognized ID and training data TD. In some embodiments, a plurality of sensors arranged at different positions of the body may be adopted.

Figure 2:
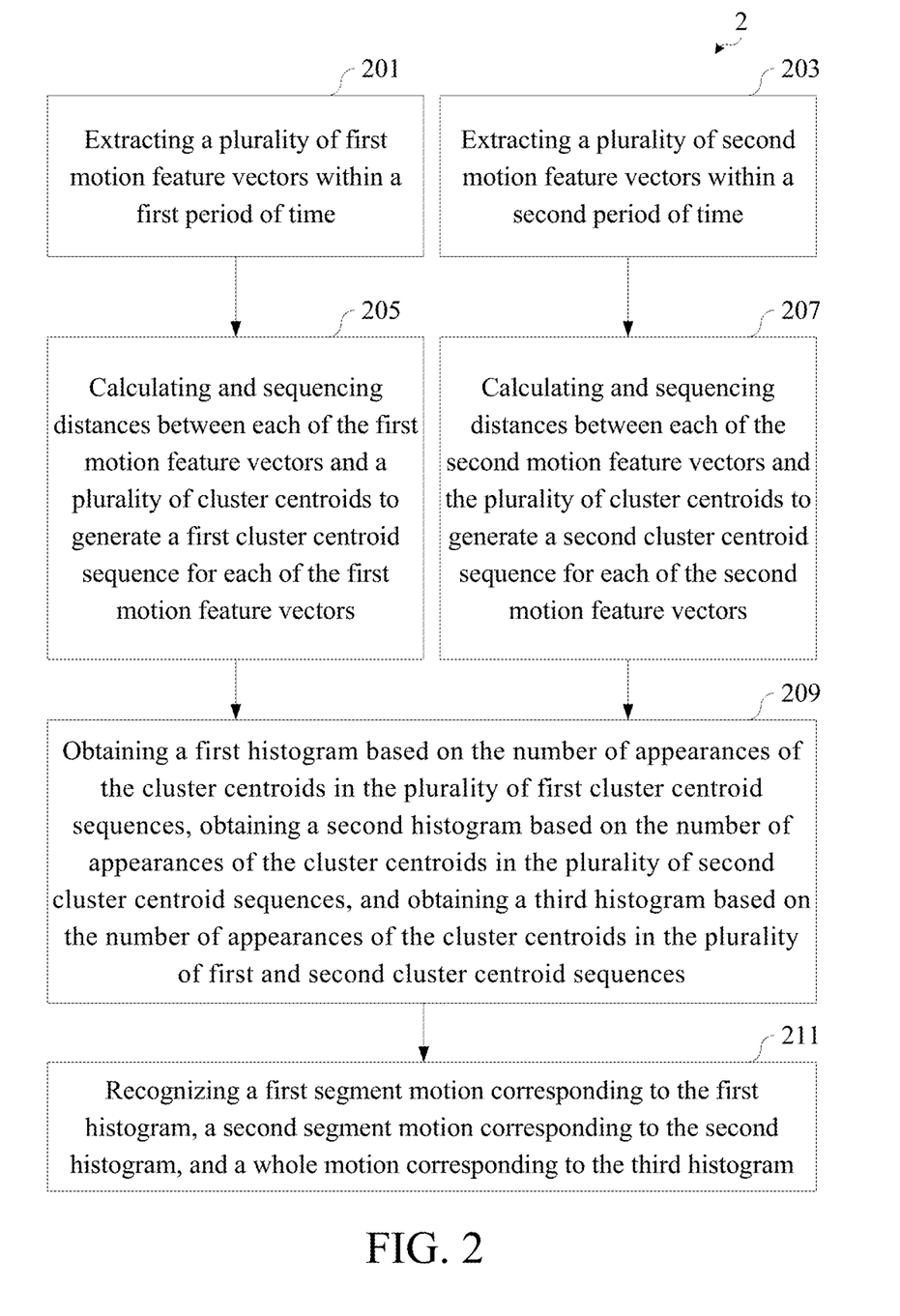
FIG. 2 illustrates a motion recognition method according to some embodiment of the present invention.

FIG. 2 illustrates a flowchart of a motion recognition method according to some embodiments of the present invention. However, the contents shown in FIG. 2 are only for illustrating embodiments of the present invention, and not for limiting the scope of the present invention.

Referring to FIG. 2, a motion recognition method (which is referred to as a "motion recognition method 2" hereinafter) for a motion recognition apparatus may comprise the following steps: extracting, by a feature extractor, a plurality of first motion feature vectors within a first period of time (labeled as step 201); extracting, by the feature extractor, a plurality of second motion feature vectors within a second period of time, wherein the first period of time is followed by the second period of time (labeled as step 203); calculating and sequencing, by a clusterer, the distances between each of the first motion feature vectors and a plurality of cluster centroids to generate a first cluster centroid sequence for each of the first motion feature vectors (labeled as step 205); calculating and sequencing, by the clusterer, the distances between the distances between each of the second motion feature vectors and the plurality of cluster centroids to generate a second cluster centroid sequence for each of the second motion feature vectors (labeled as step 207); obtaining a first histogram based on the number of appearances of the cluster centroids in the plurality of first cluster centroid sequences, obtaining a second histogram based on the number of appearances of the cluster centroids in the plurality of second cluster centroid sequences, and obtaining a third histogram based on the number of appearances of the cluster centroids in the plurality of first and second cluster centroid sequences (labeled as step 209); recognizing, by a classifier, a first segment motion corresponding to the first histogram, a second segment motion corresponding to the second histogram, and a whole motion corresponding to the third histogram (labeled as step 211).

The sequence of the steps shown in FIG. 2 is not limited, and may be adjusted as long as the motion recognition method 2 still can be implemented. In some embodiments, step 201, step 203, step 205, step 207, step 209, and step 211 can be performed in sequence. In some embodiments, step 201, step 205, step 203, step 207, step 209, and step 211 can be performed in sequence. In some embodiments, step 203, step 207, step 201, step 205, step 209, and step 211 can be performed in sequence. In some embodiments, step 203, step 201, step 207, step 205, step 209, and step 211 can be performed in sequence. In some embodiments, step 205 and step 207 can be performed simultaneously.

In some embodiments, step 209 can be divided into three sub-steps and the sub-septs can be performed separately. For example, after the plurality of first cluster centroid sequences is generated, step 209 can still be performed to obtain the first histogram by calculating, even if the second histogram has not been generated; and vice versa. Similarly, in some embodiments, step 211 can be divided into three sub-steps and the sub-septs can be performed separately. For example, after the plurality of first cluster centroid sequences is generated, step 209 can still be performed to recognize the first segment motion, even if the second histogram has not been generated; and vice versa.

In some embodiments, the feature extractor may be a CAE.

In some embodiments, the clusterer may be a k-means clusterer.

In some embodiments, the classifier may be an LSTM classifier.

In some embodiments, the classifier may be an LSTM classifier. Moreover, the loss function of the LSTM classifier includes a classification loss and a ranking loss, and the ranking loss is based on a detection score or a discriminative margin.

In some embodiments, the motion recognition method 2 may further comprise the following steps: training a feature extraction model, a clustering model, and a classification model with training data to build the feature extractor, the clusterer, the classifier respectively.

In some embodiments, the motion recognition method 2 may further comprise the following step: receiving the data to be recognized from a sensor.

In some embodiments, the motion recognition method 2 may further comprise the following step: receiving the data to be recognized from a sensor comprising an IMU.

In some embodiments, all of the above embodiments of the motion recognition method 2 can be implemented by the motion recognition apparatus 1.

Each embodiment of the motion recognition method 2 can at least correspond to a certain embodiment of the motion recognition apparatus 1. Therefore, even if not all embodiments of the motion recognition method 2 are described in detail, a person having ordinary skill in the art can still understand those details based on the descriptions for the embodiments of the motion recognition apparatus 1.

The above disclosure is related to the detailed technical contents and inventive features thereof for some embodiments of the present invention, but such disclosure is not to limit the present invention. A person having ordinary skill in the art may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A motion recognition apparatus, comprising:
   a storage, being configured to store a feature extractor, a clusterer, a classifier, and data to be recognized; and
   a processor electrically connected to the storage, being configured to:
   extract, through the feature extractor, a plurality of first motion feature vectors within a first period of time and a plurality of second motion feature vectors within a second period of time from the data to be recognized, wherein the first period of time is followed by the second period of time;
   calculate and sequence, through the clusterer, distances between each of the first motion feature vectors and a plurality of cluster centroids to generate a first cluster centroid sequence for each of the first motion feature vectors, and distances between each of the second motion feature vectors and the plurality of cluster centroids to generate a second cluster centroid sequence for each of the second motion feature vectors;
   obtain a first histogram based on the number of appearances of the cluster centroids in the plurality of first cluster centroid sequences, obtain a second histogram based on the number of appearances of the cluster centroids in the plurality of second cluster centroid sequences, and obtain a third histogram based on the number of appearances of the cluster centroids in the plurality of first and second cluster centroid sequences; and
   recognize, through the classifier, a first segment motion corresponding to the first histogram, a second segment motion corresponding to the second histogram, and a whole motion corresponding to the third histogram.

2. The motion recognition apparatus of claim 1, wherein the feature extractor is a Convolution Auto-Encoder (CAE).

3. The motion recognition apparatus of claim 1, wherein the clusterer is a k-means clusterer.

4. The motion recognition apparatus of claim 1, wherein the classifier is a Long Short Term Memory (LSTM) classifier.

5. The motion recognition apparatus of claim 4, wherein a loss function of the LSTM classifier includes a classification loss and a ranking loss, and the ranking loss is based on a detection score or a discriminative margin.

6. The motion recognition apparatus of claim 1, wherein:
   the storage is further configured to store training data; and
   the processor is further configured to train a feature extraction model, a clustering model, and a classification model with the training data to build the feature extractor, the clusterer, the classifier respectively.

7. The motion recognition apparatus of claim 1, further comprising an input interface, wherein the input interface is configured to receive the data to be recognized from a sensor.

8. The motion recognition apparatus of claim 7, wherein the sensor comprises an Inertial Measurement Unit (IMU).

9. A motion recognition method for a motion recognition apparatus, comprising:
   extracting, by a feature extractor, a plurality of first motion feature vectors within a first period of time and a plurality of second motion feature vectors within a second period of time from data to be recognized, wherein the first period of time is followed by the second period of time;

calculating and sequencing, by a clusterer, distances between each of the first motion feature vectors and a plurality of cluster centroids to generate a first cluster centroid sequence for each of the first motion feature vectors, and distances between each of the second motion feature vectors and the plurality of cluster centroids to generate a second cluster centroid sequence for each of the second motion feature vectors;

obtaining a first histogram based on the number of appearances of the cluster centroids in the plurality of first cluster centroid sequences, obtaining a second histogram based on the number of appearances of the cluster centroids in the plurality of second cluster centroid sequences, and obtaining a third histogram based on the number of appearances of the cluster centroids in the plurality of first and second cluster centroid sequences; and recognizing, by the classifier, a first segment motion corresponding to the first histogram, a second segment motion corresponding to the second histogram, and a whole motion corresponding to the third histogram.

10. The motion recognition method of claim 9, wherein the feature extractor is a CAE.

11. The motion recognition method of claim 9, wherein the clusterer is a k-means clusterer.

12. The motion recognition method of claim 9, wherein the classifier is a LSTM classifier.

13. The motion recognition method of claim 12, wherein a loss function of the LSTM classifier includes a classification loss and a ranking loss, and the ranking loss is based on a detection score or a discriminative margin.

14. The motion recognition method of claim 9, further comprising:
    training a feature extraction model, a clustering model, and a classification model with training data to build the feature extractor, the clusterer, the classifier respectively.

15. The motion recognition method of claim 9, further comprising:
    receiving the data to be recognized from a sensor.

16. The motion recognition method of claim 15, wherein the sensor comprises an IMU.

* * * * *